United States Patent
Lee

(10) Patent No.: US 12,523,741 B2
(45) Date of Patent: Jan. 13, 2026

(54) RADAR AND ANTENNA APPARATUS BUILT IN RADAR

(71) Applicants: BITSENSING INC., Seoul (KR); Jae Eun Lee, Seoul (KR)

(72) Inventor: Jae Eun Lee, Seoul (KR)

(73) Assignees: BITSENSING INC., Seoul (KR); Jae Eun Lee, Seoul (KR)

( * ) Notice: Subject to any disclaimer, the term of this patent is extended or adjusted under 35 U.S.C. 154(b) by 520 days.

(21) Appl. No.: 17/507,300

(22) Filed: Oct. 21, 2021

(65) Prior Publication Data

US 2022/0043107 A1    Feb. 10, 2022

Related U.S. Application Data

(63) Continuation of application No. PCT/KR2020/005290, filed on Apr. 22, 2020.

(30) Foreign Application Priority Data

Apr. 22, 2019 (KR) .................. 10-2019-0046892
Apr. 17, 2020 (KR) .................. 10-2020-0046918

(51) Int. Cl.
*G01S 7/03* (2006.01)
*G01S 13/02* (2006.01)

(52) U.S. Cl.
CPC .......... *G01S 7/03* (2013.01); *G01S 2013/0245* (2013.01)

(58) Field of Classification Search
CPC ...... G01S 7/03; G01S 2013/0245; H04B 7/06
See application file for complete search history.

(56) References Cited

U.S. PATENT DOCUMENTS 11,131,749 B2 *  9/2021  Loesch ................. G01S 13/931
2011/0080314 A1  4/2011  Wintermantel
(Continued)

FOREIGN PATENT DOCUMENTS

DE          3740142 A  *  6/1989  .......... G01S 13/426
DE    102016224900 A1     6/2018
(Continued)

OTHER PUBLICATIONS

European Search Report for EP Application No. 20796050.1 issued on Dec. 9, 2022.
(Continued)

*Primary Examiner* — Vladimir Magloire
*Assistant Examiner* — Eric K Hodac
(74) *Attorney, Agent, or Firm* — Dinsmore & Shohl LLP; Yongsok Choi, Esq.

(57) ABSTRACT

A radar includes a transmitter antenna unit including a plurality of transmitter antennas; a receiver antenna unit including a plurality of receiver antennas; a transceiver configured to transmit sending signals through the transmitter antenna unit and receive return signals reflected from a target object trough the receiver antenna unit; and a processing unit configured to derive information about the target object by processing the received return signals. The processing unit selects at least one of the plurality of transmitter antennas and sets the selected at least one transmitter antenna to one of a mid/long-range detection mode or a short-range detection mode. One of the transmitter antenna unit or the receiver antenna unit forms a vertical offset.

5 Claims, 10 Drawing Sheets

(56) References Cited

U.S. PATENT DOCUMENTS

| | | |
|---|---|---|
| 2015/0253419 A1 | 9/2015 | Alland |
| 2016/0033632 A1 | 2/2016 | Searcy et al. |
| 2017/0307744 A1 | 10/2017 | Loesch et al. |
| 2017/0322295 A1* | 11/2017 | Loesch .................. G01S 13/931 |
| 2018/0149735 A1 | 5/2018 | Lim et al. |
| 2019/0011532 A1 | 1/2019 | Loesch et al. |
| 2019/0391230 A1 | 12/2019 | Loesch et al. |
| 2020/0292661 A1* | 9/2020 | Lee .................... H01Q 21/0037 |

FOREIGN PATENT DOCUMENTS

| | | | | |
|---|---|---|---|---|
| EP | 3199976 A1 * | 8/2017 | ........... | G01S 13/931 |
| KR | 1020140100774 A | 8/2014 | | |
| KR | 20140100774 A * | 10/2014 | ........... | G01S 7/4026 |
| KR | 1020180060341 A | 6/2018 | | |
| KR | 1020180060343 A | 6/2018 | | |
| KR | 1020190058072 A | 5/2019 | | |
| WO | 2018108359 A1 | 6/2018 | | |

OTHER PUBLICATIONS

International Search Report of PCT/KR2020/005290 dated Jul. 29, 2020.

* cited by examiner

RADAR AND ANTENNA APPARATUS BUILT IN RADAR

CROSS REFERENCE TO RELATED APPLICATIONS

This application is a continuation of International Application No. PCT/KR2020/005290 filed on Apr. 22, 2020, which claims priority to Korean Patent Application No. 10-2019-0046892 filed on Apr. 22, 2019 and Korean Patent Application No. 10-2020-0046918 filed on Apr. 17, 2020, the entire contents of which are herein incorporated by reference.

TECHNICAL FIELD

The present disclosure relates to a radar and an antenna apparatus built in the radar.

BACKGROUND

In general, a radar needs to have high angular resolution to detect or track the distance, speed, and angle of a target device by transmitting and receiving electronic waves.

Conventional radars have a structure in which a plurality of receiver antennas is arrayed to increase angular resolution. However, a radar having this array needs large-size antennas and a lot of components connected to a transceiver. Therefore, the overall size of the radar increases.

(Patent Document 1) Korean Patent Laid-open Publication No. 10-2019-0058072 (published on May 29, 2019)

SUMMARY

Problems to be Solved by the Invention

The present disclosure is provided to solve the above-described problems of the prior art, and provides a radar with improved angular resolution in horizontal and vertical directions for mid/long-range and short-range detection by efficiently arranging a plurality of transmitter antennas and a plurality of receiver antennas. The problems to be solved by the present disclosure are not limited to the above-described problems. There may be other problems to be solved by the present disclosure.

Means for Solving the Problems

According to at least one example embodiment, a radar may include a transmitter antenna unit including a plurality of transmitter antennas; a receiver antenna unit including a plurality of receiver antennas; a transceiver configured to transmit sending signals through the transmitter antenna unit and receive return signals reflected from a target object trough the receiver antenna unit; and a processing unit configured to derive information about the target object by processing the received return signals, wherein the processing unit selects at least one of the plurality of transmitter antennas and sets the selected at least one transmitter antenna to one of a mid/long-range detection mode or a short-range detection mode, and one of the transmitter antenna unit or the receiver antenna unit forms a vertical offset.

According to at least one other example embodiment, an antenna apparatus used in a radar may include a transmitter antenna unit including a plurality of transmitter antennas; and a receiver antenna unit including a plurality of receiver antenna, wherein at least one transmitter antenna selected from among the plurality of transmitter antennas is set to one of a mid/long-range detection mode or a short-range detection mode, and one of the transmitter antenna unit or the receiver antenna unit forms a vertical offset.

This summary is provided by way of illustration only and should not be construed as limiting in any manner. Besides the above-described exemplary embodiments, there may be additional exemplary embodiments that become apparent by reference to the drawings and the detailed description that follows.

Effects of the Invention

According to any one the means for solving the problems of the present disclosure, it is possible to improve angular resolution in horizontal and vertical directions for mid/long-range and short-range detection by efficiently arranging a plurality of transmitter antennas and a plurality of receiver antennas.

DETAILED DESCRIPTION

Figure 1:
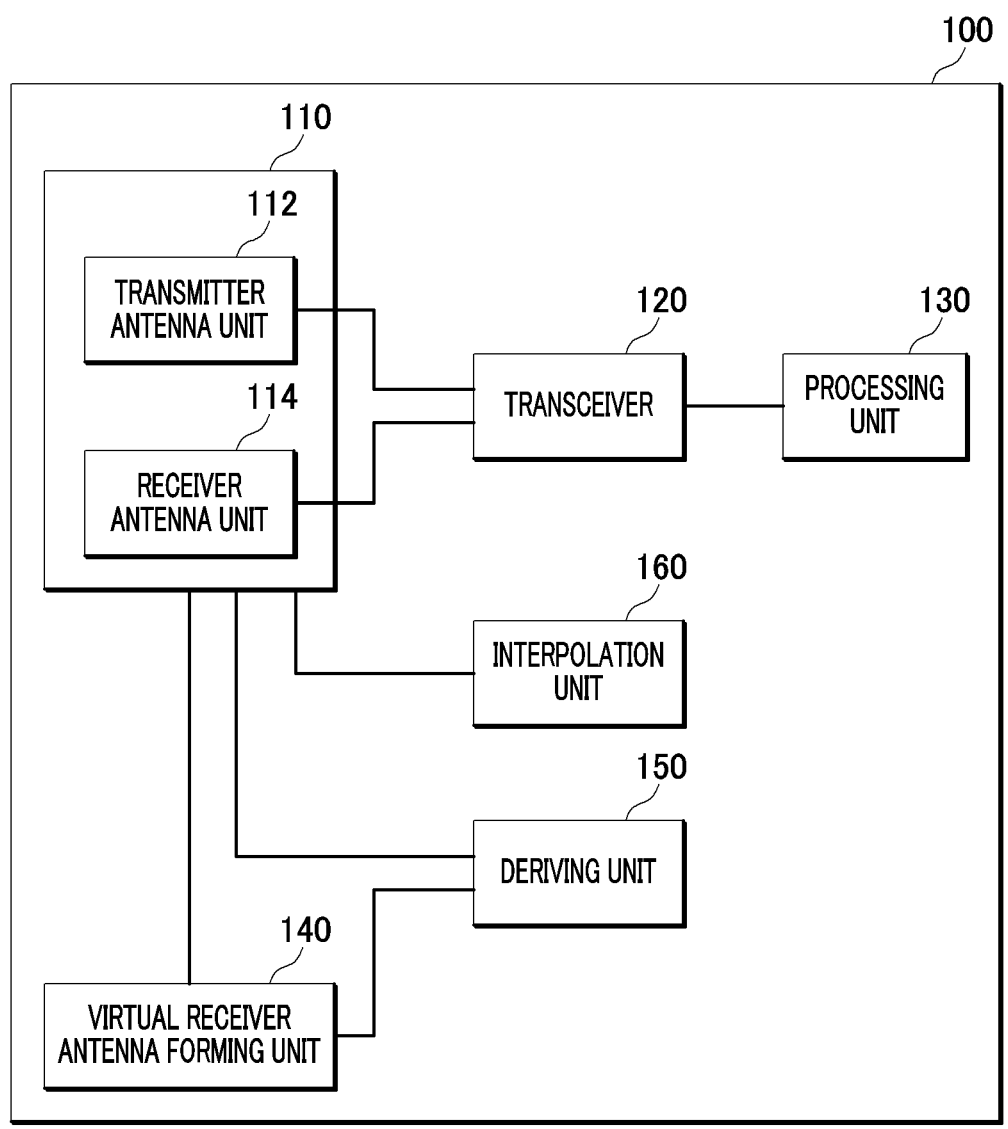
FIG. 1 is a block diagram of a radar according to an embodiment of the present disclosure.

Hereafter, example embodiments will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected" another element and an element being "electronically connected" to another element via another element. Further, it is to be understood that the terms "comprises," "includes," "comprising," and/or "including" means that one or more other components, steps, operations, and/or elements are not excluded from the described and recited systems, devices, apparatuses, and methods unless context dictates otherwise; and is not intended to preclude the possibility that one or more other components, steps, operations, parts, or combinations thereof may exist or may be added.

Throughout this document, the term "unit" may refer to a unit implemented by hardware, software, and/or a combination thereof. As examples only, one unit may be implemented by two or more pieces of hardware or two or more units may be implemented by one piece of hardware.

Throughout this document, a part of an operation or function described as being carried out by a terminal or device may be implemented or executed by a server connected to the terminal or device. Likewise, a part of an operation or function described as being implemented or executed by a server may be so implemented or executed by a terminal or device connected to the server.

Hereinafter, embodiments of the present disclosure will be explained in detail with reference to the accompanying drawings.

FIG. 1 is a block diagram of a radar 100 according to an embodiment of the present disclosure.

Referring to FIG. 1, the radar 100 may include an antenna apparatus 110, a transceiver 120, a processing unit 130, a virtual receiver antenna forming unit 140, a deriving unit 150 and an interpolation unit 160.

Hereafter, embodiments of the present disclosure will be described with reference to FIG. 1 together with FIG. 2 to FIG. 10.

The radar 100 may be installed at a specific position of a vehicle and configured to transmit a sending signal through the antenna apparatus 110, receive a receive signal reflected and returning from a target object around the vehicle, and detect the presence or absence, position, direction, or size of the target object. The target object detection result obtained by the radar 100 can be used to accurately control a vehicle system by applying it to the vehicle system that provides a collision avoidance function for avoiding a collision with a vehicle ahead, a safe lane change function, or the like.

The antenna apparatus 110 has a transmitter antenna unit 112 that includes a plurality of transmitter antennas and a receiver antenna unit 114 that includes a plurality of receiver antennas.

Figure 2:
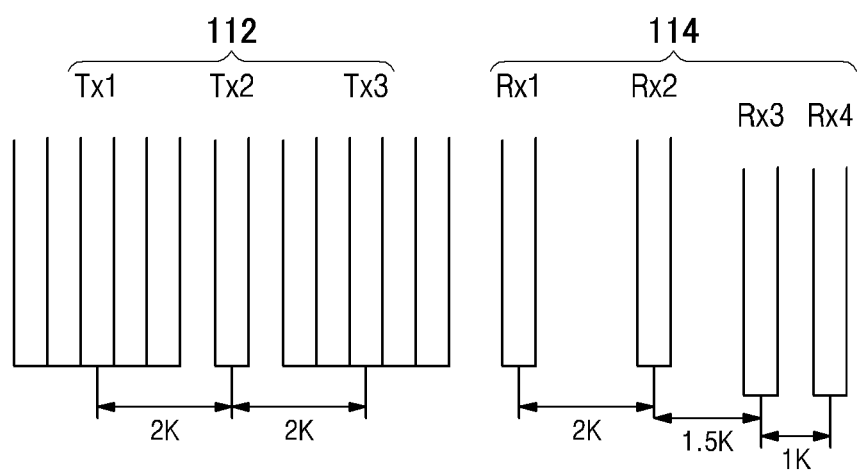
FIG. 2 illustrates a first example of the array of a plurality of transmitter antennas and a plurality of receiver antennas of an antenna apparatus included in a radar according to an embodiment of the present disclosure.

FIG. 2 illustrates a first example of the array of a plurality of transmitter antennas and a plurality of receiver antennas of an antenna apparatus included in a radar according to an embodiment of the present disclosure.

Referring to FIG. 2, the antenna apparatus 110 has a transmitter antenna unit 112 that includes a plurality of transmitter antennas Tx1, Tx2 and Tx3 arranged in a horizontal direction and a receiver antenna unit 114 that includes a plurality of receiver antennas Rx1, Rx2, Rx3 and Rx4 arranged to form a vertical offset.

The transmitter antenna unit 112 may include a plurality of transmitter antennas Tx1, Tx2 and Tx3 that transmits sending signals to detect a target object. More specifically, the transmitter antenna unit 112 may have a first transmitter antenna Tx1, a second transmitter antenna Tx2 and a third transmitter antenna Tx3 arranged on the same line at a predetermined horizontal interval. Here, each of the first transmitter antenna Tx1 and the third transmitter antenna Tx3 may have, for example, six array transmitter antennas, and the second transmitter antenna Tx2 may have, for example, two array transmitter antennas.

Each of the first transmitter antenna Tx1, the second transmitter antenna Tx2 and the third transmitter antenna Tx3 may be arranged in the horizontal direction and may be arranged at a predetermined horizontal interval according to a ratio of 1:1. For example, each of the first transmitter antenna Tx1, the second transmitter antenna Tx2 and the third transmitter antenna Tx3 may be arranged in line in the horizontal direction at a horizontal interval of 2.0 lambda.

Each of the first transmitter antenna Tx1, the second transmitter antenna Tx2 and the third transmitter antenna Tx3 has a horizontal phase difference caused by being spaced apart from each other in the horizontal direction according to a ratio of 1:1.

The plurality of transmitter antennas included in each of the first transmitter antenna Tx1, the second transmitter antenna Tx2 and the third transmitter antenna Tx3 may have a transmitter antenna beam area from which sending signals are transmitted in different vertical horizontal directions.

The receiver antenna unit 114 may include a plurality of receiver antennas that receives signals which were transmitted from the transmitter antenna unit 112 and then reflected and returned from the target object. More specifically, the receiver antenna unit 114 may include a first receiver antenna Rx1, a second receiver antenna Rx2, a third receiver antenna Rx3 and a fourth receiver antenna Rx4 arranged in the horizontal direction to form a vertical offset. Here, each of the first receiver antenna Rx1, the second receiver antenna Rx2, the third receiver antenna Rx3 and the fourth receiver antenna Rx4 may have, for example, two array receiver antennas.

The first receiver antenna Rx1, the second receiver antenna Rx2, the third receiver antenna Rx3 and the fourth receiver antenna Rx4 may be arranged in the horizontal direction at horizontal intervals according to a ratio of 4:3:2, and the third receiver antenna Rx3 and the fourth receiver antenna Rx4 may be spaced apart from each other at a predetermined vertical interval in a vertical direction.

For example, a horizontal interval between the first receiver antenna Rx1, the second receiver antenna Rx2, the third receiver antenna Rx3 and the fourth receiver antenna Rx4 may include at least 2K, 3K and 4K. The first receiver antenna Rx1 and the second receiver antenna Rx2 may be arranged at a horizontal interval of 2.0 lambda, the second receiver antenna Rx2 and the third receiver antenna Rx3 may be arranged at a horizontal interval of 1.5 lambda, and the third receiver antenna Rx3 and the fourth receiver antenna Rx4 may be arranged at a horizontal interval of 1.0 lambda.

If each of the first receiver antenna Rx1, the second receiver antenna Rx2, the third receiver antenna Rx3 and the fourth receiver antenna Rx4 includes two array antennas for each receiver channel, a receive gain can be improved. Also, beam characteristics and signal to noise ratio (SNR) can be improved.

The transceiver 120 may transmit sending signals through the transmitter antenna unit 112 and receive return signals reflected from the target object trough the receiver antenna unit 114. For example, the transceiver 120 may quickly transmit sending signals at a predetermined interval through the transmitter antenna unit 112 by a first transmission method (e.g., fast-chirp FMCW) and may receive return signals reflected from the target object through the receiver antenna unit 114.

The processing unit 130 may derive information about the target object by processing the received return signals. For example, the processing unit 130 may acquire vertical information, such as the height of the target object, and horizontal information, such as the width of the target object, from the received return signals.

The processing unit 130 may select at least one of the plurality of transmitter antennas Tx1, Tx2 and Tx3 and may set the selected at least one transmitter antenna to one of a mid/long-range detection mode or a short-range detection mode.

Figure 3A:
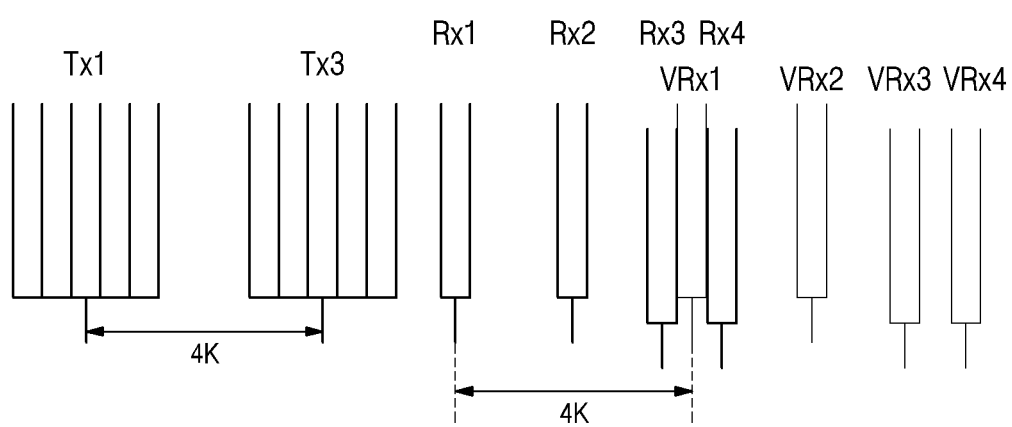
FIG. 3A illustrates an embodiment for explaining a method of setting a detection mode using the array of antennas according to the first example of the present disclosure.

Referring to FIG. 2 and FIG. 3A, if the receiver antenna unit 114 forms a vertical offset as in the first example, the processing unit 130 may select the first transmitter antenna Tx1 and the third transmitter antenna Tx3 from among the plurality of transmitter antennas Tx1, Tx2 and Tx3 and may set a detection mode of the radar 100 to the mid/long-range detection mode. According to the present disclosure, it is possible to detect the target object in a middle and long distance through a multiple-input multiple-output (MIMO) processing performed by the first transmitter antenna Tx1 and the third transmitter antenna Tx3.

When the MIMO processing is performed by the first transmitter antenna Tx1 and the third transmitter antenna Tx3 selected by the processing unit 130, the virtual receiver antenna forming unit 140 may form a virtual receiver antenna unit VRx1, VRx2, VRx3 and VRx4 arranged at a predetermined horizontal interval in the same horizontal direction as the plurality of receiver antennas Rx1, Rx2, Rx3 and Rx4 included in the receiver antenna unit 114.

The virtual receiver antenna forming unit 140 may form a virtual receiver antenna unit VRx1, VRx2, VRx3 and VRx4 spatially shifted by the interval between the first transmitter antenna Tx1 and the third transmitter antenna Tx3 in the same horizontal direction as the receiver antenna unit 114.

For example, when the first transmitter antenna Tx1 and the third transmitter antenna Tx3 transmit identical sending signals at the same time, receiver antennas configured to receive signals reflected and returning from the target object based on the sending signals can have the same effect as if they were spatially shifted by a predetermined horizontal interval (i.e., 4K, the interval between the first transmitter antenna Tx1 and the third transmitter antenna Tx3) in the horizontal direction and received the identical receive signals. The receiver antennas generated at the shifted positions can be expressed as virtual receiver antennas VRx1, VRx2, VRx3 and VRx4.

That is, a first virtual receiver antenna VRx1 may be generated at a position spaced apart by 4K from the first receiver antenna Rx1, a second virtual receiver antenna VRx2 may be generated at a position spaced apart by 4K from the second receiver antenna Rx2, a third virtual receiver antenna VRx3 may be generated at a position spaced apart by 4K from the third receiver antenna Rx3, and a fourth virtual receiver antenna VRx4 may be generated at a position spaced apart by 4K from the fourth receiver antenna Rx4.

Here, a first virtual receiver antenna group including the first virtual receiver antenna VRx1 and the second virtual receiver antenna VRx2 formed in the same horizontal direction as the first receiver antenna Rx1 and the second receiver antenna Rx2 and a second virtual receiver antenna group including the third virtual receiver antenna VRx3 and the fourth virtual receiver antenna VRx4 formed in the same horizontal direction as the third receiver antenna Rx3 and the fourth receiver antenna Rx4 may have a vertical offset at a vertical interval.

Accordingly, the first receiver antenna Rx1, the second receiver antenna Rx2, the third receiver antenna Rx3, the fourth receiver antenna Rx4, the first virtual receiver antenna VRx1, the second virtual receiver antenna VRx2, the third virtual receiver antenna VRx3 and the fourth virtual receiver antenna VRx4 are formed at a receiver end. Thus, an aperture extended to double horizontal area can be secured. Therefore, it is possible to precisely measure horizontal information about the target object in a middle and long distance and also possible to improve the resolution of the horizontal information.

Also, according to the present disclosure, it is possible to detect the target object through the plurality of receiver antennas Rx1, Rx2, Rx3 and Rx4 and the plurality of virtual receiver antennas VRx1, VRx2, VRx3 and VRx4 having the vertical offset and also possible to detect and estimate the vertical angle of the target object using a phase difference.

The present disclosure can use array interpolation to provide a virtual antenna structure to make a position where a grating lobe occurs far from the center where a main beam is located, i.e., to suppress the occurrence of a grating lobe.

Figure 4A:
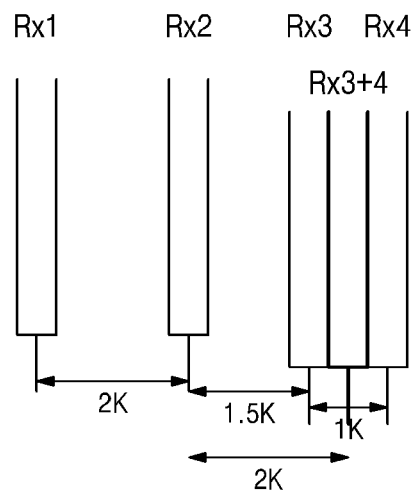
FIG. 4A illustrates an embodiment for explaining a method of deriving a vertical offset based on a phase difference using the array of antennas according to the first example of the present disclosure.
Figure 4B:
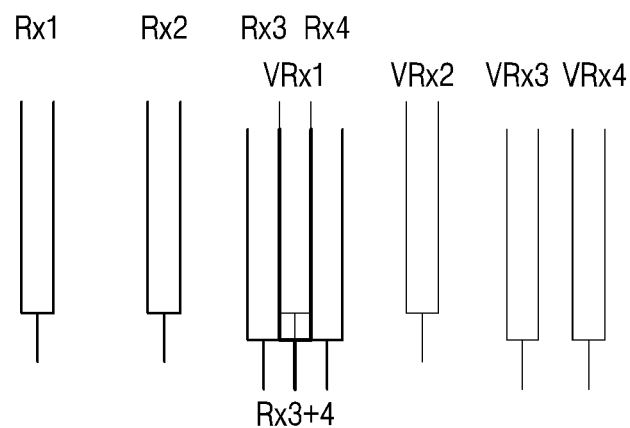
FIG. 4B illustrates an embodiment for explaining a method of deriving a vertical offset based on a phase difference using the array of antennas according to the first example of the present disclosure.

Referring to FIG. 3A and FIG. 4B, the deriving unit 150 may calculate a phase difference between at least one of the plurality of receiver antennas Rx1, Rx2, Rx3 and Rx4 included in the receiver antenna unit 114 and at least one virtual receiver antenna of the virtual receiver antenna unit VRx1, VRx2, VRx3 and VRx4 and may derive a vertical offset based on the calculated phase difference.

The deriving unit 150 may derive a vertical offset based on a phase difference between a receive signal of the first virtual receiver antenna VRx1 of the virtual receiver antenna unit VRx1, VRx2, VRx3 and VRx4 formed through the MIMO processing performed by the first transmitter antenna Tx1 and the third transmitter antenna Tx3 selected by the processing unit 130 and a receive signal Rx3+4 calculated between the third and fourth receiver antennas Rx3 and Rx4. Here, the receive signal Rx3+4 calculated between the third and fourth receiver antennas Rx3 and Rx4 may be equal to the sum of a receive signal of the third receiver antenna Rx3 and a receive signal of the fourth receiver antenna Rx4 divided by 2 (i.e., the mean between the receive signal of the third receiver antenna Rx3 and the receive signal of the fourth receiver antenna Rx4).

Figure 3B:
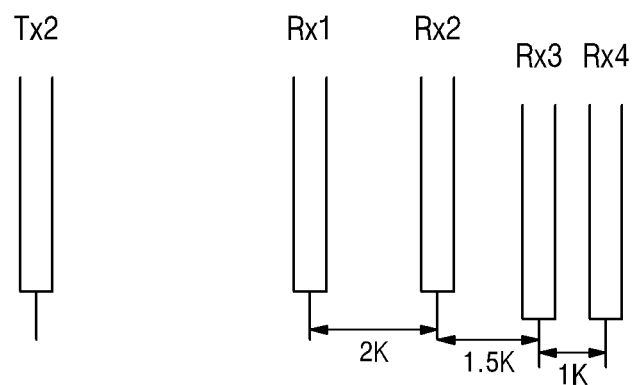
FIG. 3B illustrates an embodiment for explaining a method of setting a detection mode using the array of antennas according to the first example of the present disclosure.

Referring to FIG. 2 and FIG. 3B, if the receiver antenna unit 114 forms a vertical offset as in the first example, the processing unit 130 may select the second transmitter antenna Tx2 from among the plurality of transmitter antennas Tx1, Tx2 and Tx3 and may set a detection mode of the radar 100 to the short-range detection mode. In the short-range detection mode, only one transmitter antenna is selected, and, thus, the MIMO processing cannot be performed. Therefore, a virtual receiver antenna is not formed. According to the present disclosure, it is possible to detect the target object in a short distance using the second transmitter antenna Tx2.

Referring to FIG. 3B and FIG. 4A, the deriving unit 150 may calculate a first phase difference between a receive signal of the first receiver antenna Rx1 among the plurality of receiver antennas Rx1, Rx2, Rx3 and Rx4 included in the receiver antenna unit 114 and a receive signal of the second receiver antenna Rx2 and may calculate a second phase difference between the receive signal of the second receiver antenna Rx2 and a receive signal Rx3+4 calculated between the third and fourth receiver antennas Rx3 and Rx4. Here, the receive signal Rx3+4 calculated between the third and fourth receiver antennas Rx3 and Rx4 may be equal to the sum of a receive signal of the third receiver antenna Rx3 and a receive signal of the fourth receiver antenna Rx4 divided by 2 (i.e., the mean between the receive signal of the third receiver antenna Rx3 and the receive signal of the fourth receiver antenna Rx4). Then, the deriving unit 150 may derive a vertical offset based on a difference between the calculated first phase difference and the calculated second phase difference.

The interpolation unit 160 may form antenna patterns arranged at a predetermined horizontal interval within a horizontal area corresponding to the plurality of receiver antennas Rx1, Rx2, Rx3 and Rx4 by performing a phase correction caused by the derived vertical offset and then applying non-uniform linear array (NLA) interpolation to the plurality of receiver antennas Rx1, Rx2, Rx3 and Rx4. Here, when the NLA interpolation is applied to the plurality of receiver antennas Rx1, Rx2, Rx3 and Rx4, the maximum radiation aperture can be obtained with a limited number of receiver channels.

The virtual receiver antenna forming unit 140 may form the virtual receiver antenna unit VRx1, VRx2, VRx3 and VRx4 having a vertical offset at a vertical interval in the antenna patterns arranged at a predetermined horizontal interval by applying the NLA interpolation to the plurality of receiver antennas Rx1, Rx2, Rx3 and Rx4.

Figure 5:
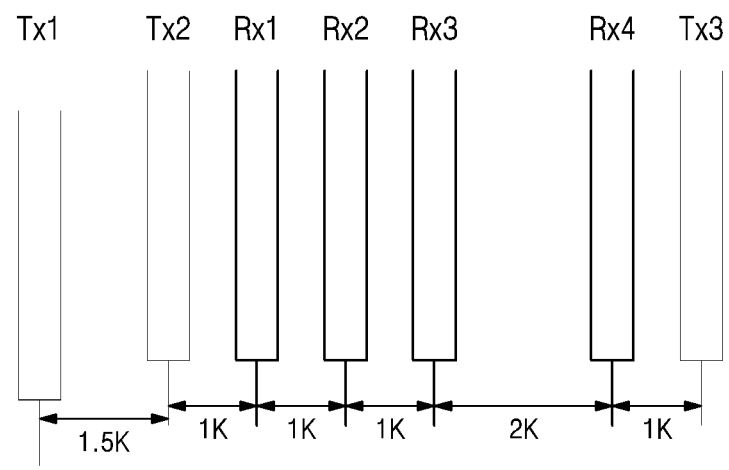
FIG. 5 illustrates a second example of the array of a plurality of transmitter antennas and a plurality of receiver antennas of an antenna apparatus included in a radar according to an embodiment of the present disclosure.

FIG. 5 illustrates a second example of the array of a plurality of transmitter antennas and a plurality of receiver antennas of an antenna apparatus included in a radar according to an embodiment of the present disclosure.

Referring to FIG. 5, the antenna apparatus 110 may include the transmitter antenna unit 112 including a plurality of transmitter antennas Tx1, Tx2 and Tx3 having a vertical offset and the receiver antenna unit 114 including a plurality of receiver antennas Rx1, Rx2 and Rx3 arranged in the horizontal direction. Here, the plurality of receiver antennas Rx1, Rx2 and Rx3 may be arranged between the plurality of transmitter antennas Tx1, Tx2 and Tx3. For example, the plurality of receiver antennas Rx1, Rx2 and Rx3 may be arranged between the second transmitter antenna Tx2 and the third transmitter antenna Tx3.

Each of the plurality of transmitter antennas Tx1, Tx2 and Tx3 included in the transmitter antenna unit 112 may include, for example, two or more array transmitter antennas.

Each of the plurality of receiver antennas Rx1, Rx2 and Rx3 included in the receiver antenna unit 114 may include, for example, two or more array receiver antennas. If each of the plurality of receiver antennas Rx1, Rx2 and Rx3 has two or more array antennas, it is possible to improve relative gains.

The first transmitter antenna Tx1, the second transmitter antenna Tx2 and the third transmitter antenna Tx3 have a horizontal phase difference caused by being spaced apart from each other in the horizontal direction according to a ratio of 1:4, and the first transmitter antenna Tx1 has a vertical phase difference caused by being spaced apart from the second transmitter antenna Tx2 and the third transmitter antenna Tx3 in the vertical direction at a predetermined vertical interval.

The first receiver antenna Rx1, the second receiver antenna Rx2, the third receiver antenna Rx3 and the fourth receiver antenna Rx4 may be arranged in the horizontal direction at a horizontal interval according to a ratio of 1:1:2. Also, the first receiver antenna Rx1, the second receiver antenna Rx2, the third receiver antenna Rx3 and the fourth receiver antenna Rx4 have a horizontal phase difference caused by being spaced apart from each other in the horizontal direction according to a ratio of 1:1:2.

The processing unit 130 may select at least one of the plurality of transmitter antennas Tx1, Tx2 and Tx3 and may set the selected at least one transmitter antenna to one of the mid/long-range detection mode or the short-range detection mode.

Figure 6A:
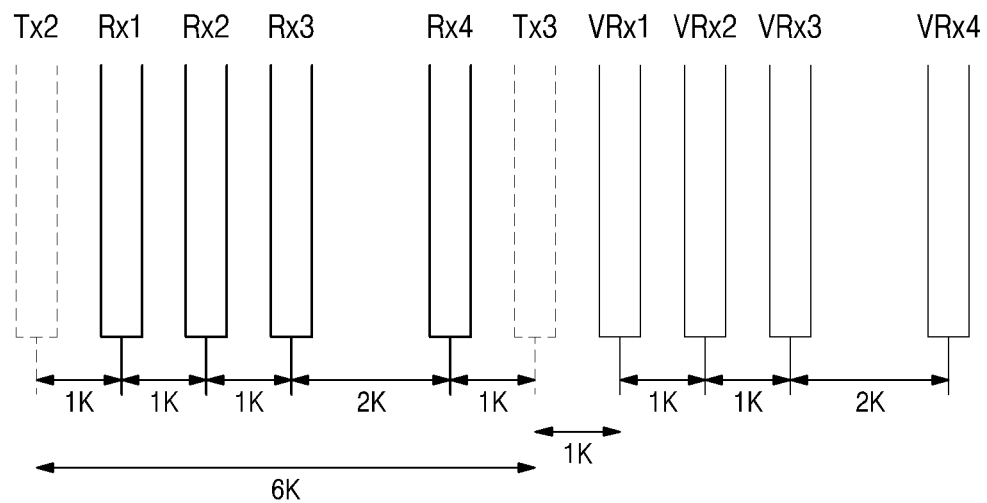
FIG. 6A illustrates an embodiment for explaining a method of setting a detection mode using the array of antennas according to the second example of the present disclosure.

Referring to FIG. 5 and FIG. 6A, if the transmitter antenna unit 112 forms a vertical offset as in the second example, the processing unit 130 may select at least two transmitter antennas, which do not form a vertical offset, from among the plurality of transmitter antennas Tx1, Tx2 and Tx3 and may set a detection mode to the mid/long-range detection mode.

The processing unit 130 may select the second transmitter antenna Tx2 and the third transmitter antenna Tx3, which do not form a vertical offset, from among the plurality of transmitter antennas Tx1, Tx2 and Tx3 and may set a detection mode of the radar 100 to the mid/long-range detection mode. Thus, it is possible to detect the target object in a middle and long distance with high resolution through the MIMO processing performed by the second transmitter antenna Tx2 and the third transmitter antenna Tx3.

When the MIMO processing is performed by the second transmitter antenna Tx2 and the third transmitter antenna Tx3 which do not form a vertical offset and are selected by the processing unit 130, the virtual receiver antenna forming unit 140 may form the virtual receiver antenna unit VRx1, VRx2, VRx3 and VRx4 arranged at a predetermined horizontal interval in the same horizontal direction as the plurality of receiver antennas Rx1, Rx2, Rx3 and Rx4 included in the receiver antenna unit 114.

Figure 6B:
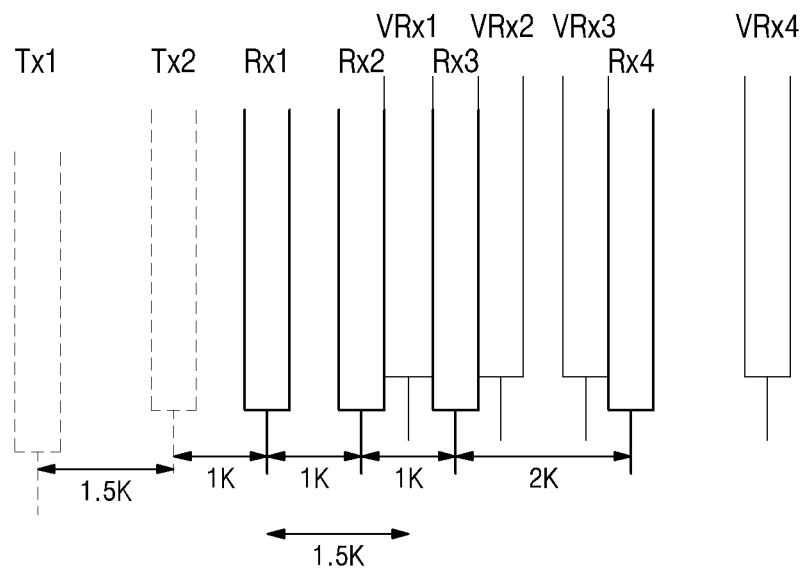
FIG. 6B illustrates an embodiment for explaining a method of setting a detection mode using the array of antennas according to the second example of the present disclosure.

Referring to FIG. 5 and FIG. 6B, if the transmitter antenna unit 112 forms a vertical offset as in the second example, the processing unit 130 may select at least two transmitter antennas, which form a vertical offset, from among the plurality of transmitter antennas Tx1, Tx2 and Tx3 and may set a detection mode to the short-range detection mode.

The processing unit 130 may select the first transmitter antenna Tx1 and the second transmitter antenna Tx2, which form a vertical offset, from among the plurality of transmitter antennas Tx1, Tx2 and Tx3 and may set a detection mode of the radar 100 to the short-range detection mode. Thus, it is possible to determine whether a grating lobe occurs through the MIMO processing performed by the first transmitter antenna Tx1 and the second transmitter antenna Tx2, and possible to vertically detect the target object in a short distance.

When the MIMO processing is performed by at least two transmitter antennas (the first transmitter antenna Tx1 and the second transmitter antenna Tx2) arranged at a predetermined horizontal interval and a predetermined vertical interval and selected for setting a detection mode to the short-range detection mode, the virtual receiver antenna forming unit 140 may form the virtual receiver antenna unit spaced apart from the receiver antenna unit 114 at a horizontal interval and having a vertical offset at a vertical interval with respect to the receiver antenna unit 114. Here, the virtual receiver antenna unit may have a vertical offset at a vertical interval with respect to the receiver antenna unit 114 depending on the vertical offset formed between the first transmitter antenna Tx1 and the second transmitter antenna Tx2.

When the plurality of receiver antennas Rx1, Rx2 and Rx3 is arranged between the plurality of receiver antennas Tx1, Tx2 and Tx3 to perform the MIMO processing, it is possible to improve angular resolution compared to the whole size of the antenna apparatus 110.

Figure 7:
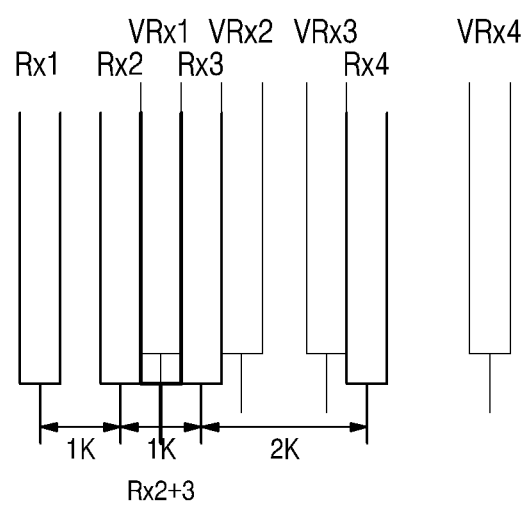
FIG. 7 illustrates an embodiment for explaining a method of deriving a vertical offset based on a phase difference using the array of antennas according to the second example of the present disclosure.

Referring to FIG. 6B and FIG. 7, the deriving unit 150 may derive a vertical offset based on a phase difference between at least one of the plurality of receiver antennas Rx1, Rx2, Rx3 and Rx4 included in the receiver antenna unit 114 and at least one virtual receiver antenna of the virtual receiver antenna unit VRx1, VRx2, VRx3 and VRx4.

The deriving unit 150 may derive a vertical offset based on a phase difference between a receive signal of the first virtual receiver antenna VRx1 of the virtual receiver antenna unit VRx1, VRx2, VRx3 and VRx4 formed through the MIMO processing performed by the first transmitter antenna Tx1 and the second transmitter antenna Tx2 selected by the processing unit 130 and a receive signal Rx2+3 calculated between the second and third receiver antennas Rx2 and Rx3 among the plurality of receiver antennas Rx1, Rx2, Rx3 and Rx4. Here, the receive signal Rx2+3 calculated between the second and third receiver antennas Rx2 and Rx3 is marked in red in FIG. 7 and may be equal to the sum of a receive signal of the second receiver antenna Rx2 and a receive signal of the third receiver antenna Rx3 divided by 2 (i.e., the mean between the receive signal of the second receiver antenna Rx2 and the receive signal of the third receiver antenna Rx3).

Also, the deriving unit 150 may derive a vertical offset based on a phase difference between a receive signal VRx1+2 calculated between the first and second virtual receiver antennas VRx1 and VRx2 of the virtual receiver antenna unit VRx1, VRx2, VRx3 and VRx4 formed through the MIMO processing performed by the first transmitter antenna Tx1 and the second transmitter antenna Tx2 selected by the processing unit 130 and a receive signal of the third receiver antenna Rx3. Here, the receive signal VRx1+2 calculated between the first and second virtual receiver antennas VRx1 and VRx2 may be equal to the sum of a receive signal of the first virtual receiver antenna VRx1 and a receive signal of the second virtual receiver antenna VRx2 divided by 2 (i.e., the mean between the receive signal of the first virtual receiver antenna VRx1 and the receive signal of the second virtual receiver antenna VRx2). Here, the receive signal VRx1+2 calculated between the first and second virtual receiver antennas VRx1 and VRx2 overlaps with the receive signal of the third receiver antenna Rx3 in the horizontal direction and is different from the receive signal of the third receiver antenna Rx3 in the vertical direction.

The interpolation unit 160 may form antenna patterns arranged at a predetermined horizontal interval within a horizontal area corresponding to the plurality of receiver antennas Rx1, Rx2, Rx3 and Rx4 by performing a phase correction caused by the derived vertical offset and then applying the NLA interpolation to the plurality of receiver antennas Rx1, Rx2, Rx3 and Rx4.

The virtual receiver antenna forming unit 140 may form the virtual receiver antenna unit VRx1, VRx2, VRx3 and VRx4 having a vertical offset at a vertical interval in the antenna patterns arranged at a predetermined horizontal interval by applying the NLA interpolation to the plurality of receiver antennas Rx1, Rx2, Rx3 and Rx4.

Figure 8:
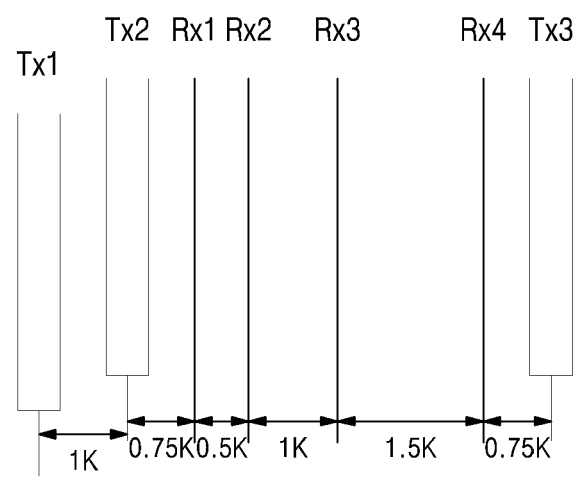
FIG. 8 illustrates a third example of the array of a plurality of transmitter antennas and a plurality of receiver antennas of an antenna apparatus included in a radar according to an embodiment of the present disclosure.

FIG. 8 illustrates a third example of the array of a plurality of transmitter antennas and a plurality of receiver antennas of an antenna apparatus included in a radar according to an embodiment of the present disclosure.

Referring to FIG. 8, the antenna apparatus 110 may include the transmitter antenna unit 112 including a plurality of transmitter antennas Tx1, Tx2 and Tx3 having a vertical offset and the receiver antenna unit 114 including a plurality of receiver antennas Rx1, Rx2 and Rx3 arranged in the horizontal direction. Here, the plurality of receiver antennas Rx1, Rx2 and Rx3 may be arranged between the plurality of transmitter antennas Tx1, Tx2 and Tx3. For example, the plurality of receiver antennas Rx1, Rx2 and Rx3 may be arranged between the second transmitter antenna Tx2 and the third transmitter antenna Tx3.

Each of the plurality of transmitter antennas Tx1, Tx2 and Tx3 included in the transmitter antenna unit 112 may include, for example, two or more array transmitter antennas.

Each of the plurality of receiver antennas Rx1, Rx2 and Rx3 included in the receiver antenna unit 114 may have, for example, a single array antenna. If each of the plurality of receiver antennas Rx1, Rx2 and Rx3 has a single array antenna, it is possible to realize a wide field of view.

The first transmitter antenna Tx1, the second transmitter antenna Tx2 and the third transmitter antenna Tx3 have a horizontal phase difference caused by being spaced apart from each other in the horizontal direction according to a ratio of 2:9, and the first transmitter antenna Tx1 has a vertical phase difference caused by being spaced apart from the second transmitter antenna Tx2 and the third transmitter antenna Tx3 in the vertical direction at a predetermined vertical interval.

The first receiver antenna Rx1, the second receiver antenna Rx2, the third receiver antenna Rx3 and the fourth receiver antenna Rx4 may be arranged in the horizontal direction at a horizontal interval according to a ratio of 1:3:3. Also, the first receiver antenna Rx1, the second receiver antenna Rx2, the third receiver antenna Rx3 and the fourth receiver antenna Rx4 have a horizontal phase difference caused by being spaced apart from each other in the horizontal direction according to a ratio of 1:2:3.

The processing unit 130 may select at least one of the plurality of transmitter antennas Tx1, Tx2 and Tx3 and may set the selected at least one transmitter antenna to one of the mid/long-range detection mode or the short-range detection mode.

Figure 9A:
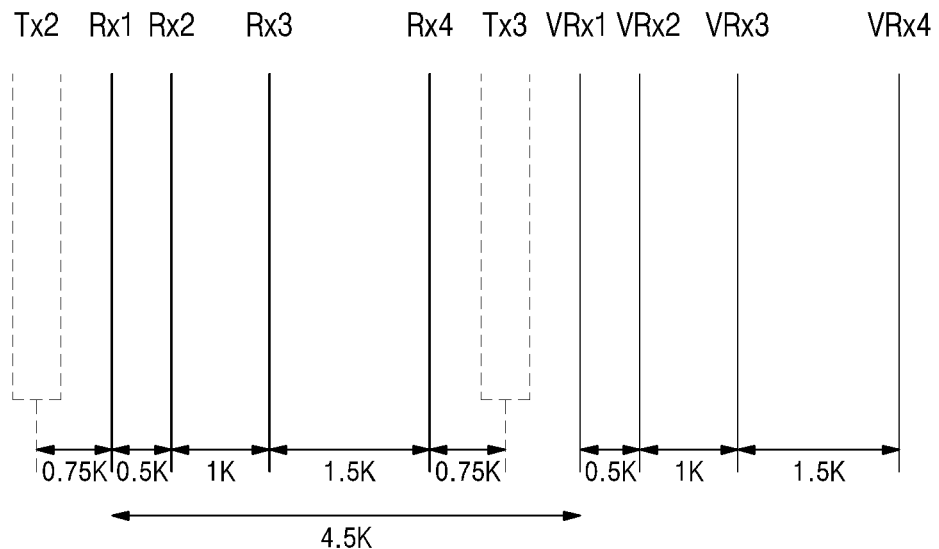
FIG. 9A illustrates an embodiment for explaining a method of setting a detection mode using the array of antennas according to the third example of the present disclosure.

Referring to FIG. 8 and FIG. 9A, if the transmitter antenna unit 112 forms a vertical offset as in the third example, the processing unit 130 may select the second transmitter antenna Tx2 and the third transmitter antenna Tx3, which do not form a vertical offset, from among the plurality of transmitter antennas Tx1, Tx2 and Tx3 and may set a detection mode of the radar 100 to the mid/long-range detection mode. Thus, it is possible to detect the target object in a middle and long distance with high resolution through the MIMO processing performed by the second transmitter antenna Tx2 and the third transmitter antenna Tx3.

When the MIMO processing is performed by the second transmitter antenna Tx2 and the third transmitter antenna Tx3 which do not form a vertical offset and are selected by the processing unit 130, the virtual receiver antenna forming unit 140 may form the virtual receiver antenna unit VRx1, VRx2, VRx3 and VRx4 arranged at a predetermined horizontal interval in the same horizontal direction as the plurality of receiver antennas Rx1, Rx2, Rx3 and Rx4 included in the receiver antenna unit 114.

Figure 9B:
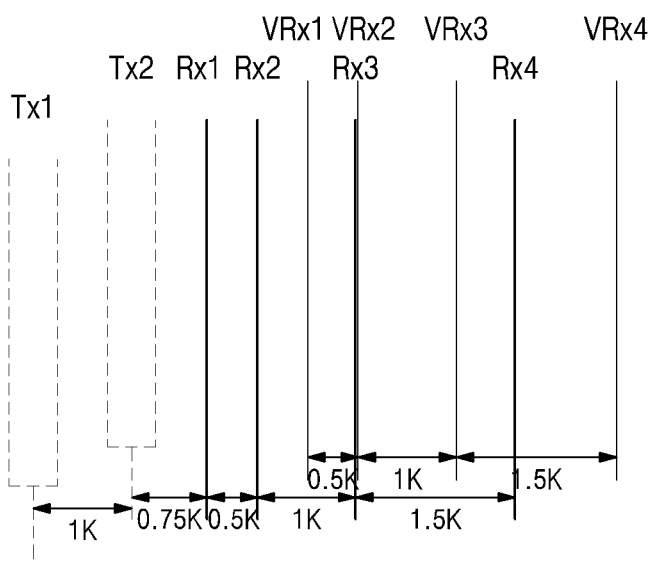
FIG. 9B illustrates an embodiment for explaining a method of setting a detection mode using the array of antennas according to the third example of the present disclosure.

Referring to FIG. 8 and FIG. 9B, if the transmitter antenna unit 112 forms a vertical offset as in the third example, the processing unit 130 may select the first transmitter antenna Tx1 and the second transmitter antenna Tx2, which form a vertical offset, from among the plurality of transmitter antennas Tx1, Tx2 and Tx3 and may set a detection mode of the radar 100 to the short-range detection mode. Thus, it is possible to determine whether a grating lobe occurs through the MIMO processing performed by the first transmitter antenna Tx1 and the second transmitter antenna Tx2, and possible to vertically detect the target object in a short distance.

When the MIMO processing is performed by the first transmitter antenna Tx1 and the second transmitter antenna Tx2 arranged at a predetermined horizontal interval and a predetermined vertical interval and selected for setting a detection mode to the short-range detection mode, the virtual receiver antenna forming unit 140 may form the virtual receiver antenna unit spaced apart from the receiver antenna unit 114 at a horizontal interval and having a vertical offset at a vertical interval with respect to the receiver antenna unit 114. Here, the virtual receiver antenna unit may have a vertical offset at a vertical interval with respect to the receiver antenna unit 114 depending on the vertical offset formed between the first transmitter antenna Tx1 and the second transmitter antenna Tx2.

Figure 10:
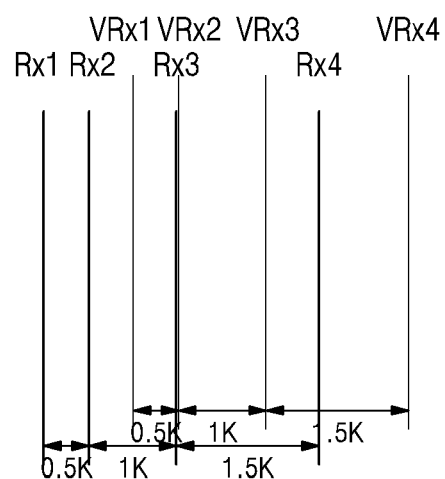
FIG. 10 illustrates an embodiment for explaining a method of deriving a vertical offset based on a phase difference using the array of antennas according to the third example of the present disclosure.

Referring to FIG. 9B and FIG. 10, the deriving unit 150 may drive a vertical offset based on a phase difference between at least one of the plurality of receiver antennas Rx1, Rx2, Rx3 and Rx4 included in the receiver antenna unit 114 and at least one virtual receiver antenna of the virtual receiver antenna unit VRx1, VRx2, VRx3 and VRx4.

The deriving unit 150 may derive a vertical offset based on a phase difference between the second virtual receiver antenna VRx2 of the virtual receiver antenna unit VRx1, VRx2, VRx3 and VRx4 formed through the MIMO processing performed by the first transmitter antenna Tx1 and the second transmitter antenna Tx2 selected by the processing unit 130 and the third receiver antenna Rx3 of the plurality of receiver antennas Rx1, Rx2, Rx3 and Rx4.

The interpolation unit 160 may form antenna patterns arranged at a predetermined horizontal interval within a horizontal area corresponding to the plurality of receiver antennas Rx1, Rx2, Rx3 and Rx4 by performing a phase correction caused by the derived vertical offset and then applying the NLA interpolation to the plurality of receiver antennas Rx1, Rx2, Rx3 and Rx4.

The virtual receiver antenna forming unit 140 may form the virtual receiver antenna unit VRx1, VRx2, VRx3 and VRx4 having a vertical offset at a vertical interval in the antenna patterns arranged at a predetermined horizontal interval by applying the NLA interpolation to the plurality of receiver antennas Rx1, Rx2, Rx3 and Rx4.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

What is claimed is:

1. A radar, comprising:
   a transmitter antenna unit including a plurality of transmitter antennas that are arranged on the same line in a horizontal direction;
   a receiver antenna unit including a plurality of receiver antennas;
   a transceiver configured to transmit sending signals through the transmitter antenna unit and receive return signals reflected from a target object through the receiver antenna unit;
   a processing unit configured to derive information about the target object by processing the received return signals;
   a virtual receiver antenna forming unit configured to form a virtual receiver antenna unit arranged at a predetermined horizontal interval from the receiver antenna unit when a multiple-input multiple-output (MIMO) processing is performed by a first transmitter antenna and a second transmitter antenna arranged at the horizontal interval; and
   a deriving unit configured to derive a vertical offset based on a phase difference between at least one receiver antenna of the receiver antenna unit and at least one virtual receiver antenna of the virtual receiver antenna unit,
   wherein the receiver antenna unit forms a vertical offset,
   in a first-range detection mode, the processing unit selects two or more of the plurality of transmitter antennas and sets the selected two or more transmitter antennas to the first-range detection mode, and the transceiver transmits the sending signals through the selected two or more transmitter antennas,
   in a second-range detection mode, the processing unit selects at least one of the plurality of transmitter antennas and sets the at least one selected transmitter antenna to the second-range detection mode, and the transceiver transmits the sending signals through the selected at least one transmitter antenna, and
   a detection range of the radar operating in the first-range detection mode is longer than a detection range of the radar operating in the second-range detection mode.

2. The radar of claim 1,
   in the second-range detection mode, the processing unit selects a single transmitter antenna from among the plurality of transmitter antennas and sets the selected transmitter antenna to the second-range detection mode, and in the second-range detection mode, the transceiver transmits the sending signals through the single transmitter antenna only.

3. A radar, comprising:

a transmitter antenna unit including a plurality of transmitter antennas;

a receiver antenna unit including a plurality of receiver antennas;

a transceiver configured to transmit sending signals through the transmitter antenna unit and receive return signals reflected from a target object through the receiver antenna unit;

a processing unit configured to derive information about the target object by processing the received return signals;

a virtual receiver antenna forming unit configured to form a virtual receiver antenna unit arranged at a predetermined horizontal interval from the receiver antenna unit when a multiple-input multiple-output (MIMO) processing is performed by a first transmitter antenna and a second transmitter antenna arranged at the horizontal interval; and a deriving unit configured to derive a vertical offset based on a phase difference between at least one receiver antenna of the receiver antenna unit and at least one virtual receiver antenna of the virtual receiver antenna unit, wherein the transmitter antenna unit forms a vertical offset, and the receiver antenna unit does not form a vertical offset, in a first-range detection mode, the processing unit selects at least two transmitter antennas, which do not form the vertical offset, from among the plurality of transmitter antennas included in the transmitter antenna unit, sets the selected transmitter antenna to the first-range detection mode, and the transceiver transmits the sending signals through the selected at least two transmitter antennas, in a second-range detection mode, the processing unit selects at least two transmitter antennas, which form the vertical offset, from among the plurality of transmitter antennas included in the transmitter antenna unit, sets the selected at least two transmitter antennas to the second-range detection mode, and the transceiver transmits the sending signals through the selected at least two transmitter antennas, and a detection range of the radar operating in the first-range detection mode is longer than a detection range of the radar operating in the second-range detection mode.

4. An antenna apparatus used in a radar, comprising:

a transmitter antenna unit including a plurality of transmitter antennas that are arranged on the same line in a horizontal direction;

a receiver antenna unit including a plurality of receiver antennas;

a virtual receiver antenna forming unit configured to form a virtual receiver antenna unit arranged at a predetermined horizontal interval from the receiver antenna unit when a multiple-input multiple-output (MIMO) processing is performed by a first transmitter antenna and a second transmitter antenna arranged at the horizontal interval; and a deriving unit configured to derive a vertical offset based on a phase difference between at least one receiver antenna of the receiver antenna unit and at least one virtual receiver antenna of the virtual receiver antenna unit, wherein the receiver antenna unit forms a vertical offset, in a first-range detection mode, two or more transmitter antennas selected from among the plurality of transmitter antennas are set to the first-range detection mode, and a transceiver transmits sending signals through the selected two or more transmitter antennas, in a second-range detection mode, one or more transmitter antennas selected from among the plurality of transmitter antennas are set to the second-range detection mode, and the transceiver transmits the sending signals through the selected one or more transmitter antennas, and a detection range of the radar operating in the first-range detection mode is longer than a detection range of the radar operating in the second-range detection mode.

5. The antenna apparatus of claim 4, wherein in the second-range detection mode, a single transmitter antenna selected from among the plurality of transmitter antennas is set to the second-range detection mode, and in the second-range detection mode, the transceiver transmits the sending signals through the single transmitter antenna only.

* * * * *